(12) United States Patent
Yadvish

(10) Patent No.: US 9,916,748 B1
(45) Date of Patent: Mar. 13, 2018

(54) TALKING WATER TANK MINDER

(71) Applicant: Robert D. Yadvish, Bayonne, NJ (US)

(72) Inventor: Robert D. Yadvish, Bayonne, NJ (US)

( * ) Notice: Subject to any disclaimer, the term of this patent is extended or adjusted under 35 U.S.C. 154(b) by 0 days.

(21) Appl. No.: 15/496,457

(22) Filed: Apr. 25, 2017

(51) Int. Cl.
  G08B 21/00 (2006.01)
  G08B 21/18 (2006.01)
  E03B 7/07 (2006.01)
  E03C 1/00 (2006.01)
  G01M 3/40 (2006.01)

(52) U.S. Cl.
  CPC ............. *G08B 21/18* (2013.01); *E03B 7/071* (2013.01); *E03B 7/078* (2013.01); *E03C 1/00* (2013.01); *G01M 3/40* (2013.01)

(58) Field of Classification Search
  CPC .......... G08B 21/18; G08B 21/20; E03B 7/071
  USPC .................................................. 340/605, 618
  See application file for complete search history.

(56) References Cited

U.S. PATENT DOCUMENTS

| | | |
|---|---|---|
| 3,667,436 A | 6/1972 | Reichhelm |
| 3,770,002 A | 11/1973 | Brown |
| 3,915,196 A | 10/1975 | Bergman |
| 4,073,471 A | 2/1978 | Lehtinen |
| 4,572,113 A | 2/1986 | Baughman |
| 4,659,063 A | 4/1987 | Veillete et al. |
| 4,805,662 A | 2/1989 | Moody |
| 5,038,820 A | 8/1991 | Ames et al. |
| 5,240,022 A | 8/1993 | Franklin |
| 5,632,302 A * | 5/1997 | Lenoir, Jr. .............. F16K 31/02 122/504.2 |
| 5,655,561 A * | 8/1997 | Wendel ................. G01F 23/243 137/312 |
| 5,844,492 A * | 12/1998 | Buffin, Sr. ............ F24H 9/2035 137/312 |
| 5,870,024 A * | 2/1999 | Arvelo, Jr. .......... G01F 23/0053 200/84 R |
| 6,035,699 A * | 3/2000 | Parlante ................ G01M 3/045 340/605 |
| 6,084,520 A | 7/2000 | Salvucci |
| 6,135,133 A * | 10/2000 | Ridgeway, Jr. ......... F24H 9/165 122/504.2 |
| 6,206,337 B1 | 3/2001 | Veillet, Jr. |
| 6,357,467 B1 | 3/2002 | Ringer |
| 6,612,536 B2 | 9/2003 | Dalton |
| 7,900,647 B2 | 3/2011 | Tornay |

(Continued)

FOREIGN PATENT DOCUMENTS

| | | |
|---|---|---|
| EP | 1195547 A2 | 4/2002 |
| EP | 2549092 A1 | 1/2011 |

*Primary Examiner* — Toan N Pham
(74) *Attorney, Agent, or Firm* — Weitzman Law Offices, LLC

(57) ABSTRACT

A system for detecting and stopping flooding from a residential water heating system. A central controller is coupled to one or more flooding sensors and one or more automatic valves. In response to the sensors' detecting water, the controller causes the automatic valves to close, shutting off flow of water into or out of the water heating system. Advanced modular galvanic sensors and low-voltage, high-torque automatic ball valves may be used to improve the energy efficiency and responsiveness of the system. When flooding is detected, a variety of visual and auditory signals are generated by the controller, providing advance warning to the blind, deaf, or elderly that flooding is occurring and prompt attention is required.

19 Claims, 8 Drawing Sheets

(56) References Cited

U.S. PATENT DOCUMENTS

| | | | |
|---|---|---|---|
| 8,319,626 B1 | 11/2012 | Cantolino | |
| 8,443,823 B1 | 5/2013 | Prager | |
| 8,567,757 B2 | 10/2013 | Pitchford et al. | |
| 8,967,123 B2 | 3/2015 | Saito | |
| 9,127,443 B1 | 9/2015 | Raffaldt | |
| 2003/0132408 A1 | 7/2003 | Dalton | |
| 2005/0001186 A1 | 1/2005 | Therriault | |
| 2007/0095400 A1 | 5/2007 | Bergquist et al. | |
| 2008/0252447 A1* | 10/2008 | Atherton | G08B 17/10 340/540 |
| 2011/0073189 A1 | 3/2011 | Elbert et al. | |
| 2011/0248199 A1 | 10/2011 | Konovalsi | |
| 2013/0000752 A1 | 1/2013 | Saito et al. | |
| 2014/0299806 A1 | 10/2014 | Hoffmann | |

* cited by examiner

TALKING WATER TANK MINDER

FIELD OF INVENTION

This disclosure relates to systems and sensors for detecting flooding or plumbing leaks, and more specifically, to a modular system of sensors and valves that provides warning and aid to physically disabled homeowners in preventing flood damage to their homes.

BACKGROUND

Water heating tanks and tankless water heating systems receive input water at a very high pressure and heat it before delivering the water at a rate of several gallons per minute to an opened hot water faucet or an appliance such as a dishwasher or washing machine. If a leak develops in the heating system, its storage tank, one of its input or output valves, or a pipe downstream from the heater, water can rapidly be lost, flood a basement or other portion of a residence, and cause substantial damage.

Human users with diminished sensory capacity, such as blindness or deafness, may have particular difficulty determining that flooding is occurring and promptly responding to it. Alarms may remain unheard by the deaf, or valves to shut off water may be difficult to locate by the blind, leading to a longer period of time between the beginning of flooding and the shut-off of the flow of water.

SUMMARY

According to an embodiment of the present invention, a system for home flooding detection is described that incorporates one or more flooding sensors, one or more automatic shut-off valves, and a controller coupled to the one or more flooding sensors and the one or more automatic shut-off valves. The controller is configured to receive a signal indicating presence of moisture at one of the one or more flooding sensors, transmit, to one of the one more automatic shut-off valves, a signal instructing that automatic shut-off valve to shut off a flow of water, and display a message observable by a human bystander indicating that a leak has occurred.

According to another embodiment of the present invention, a computing device for flood mitigation is described, comprising a speaker, one or more light emitting diodes, a processor, and non-transitory memory storing instructions. The instructions when executed by the processor, cause the computing device to: receive a signal indicating presence of moisture at one or more flooding sensors; transmit, to an automatic shut-off valve, a signal instructing the automatic shut-off valve to shut off a flow of water; and display, via the speaker or one or more light emitting diodes, a message configured to inform a human bystander with diminished vision or hearing capacity that a leak has occurred.

According to another embodiment of the present invention, a computing device for sensing flooding is described, comprising at least two concentric circular arrangements of galvanic contacts and a light emitting diode. The device is configured to display a visual cue to a human user with diminished hearing capacity upon detecting flooding.

DETAILED DESCRIPTION

Figure 1:
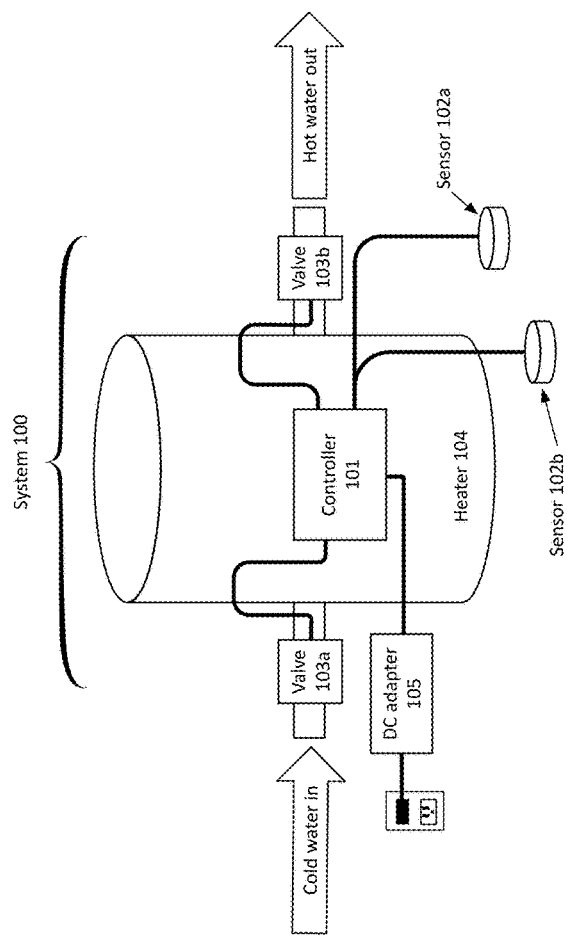
FIG. 1 illustrates, in simplified form, an example system for detecting a leak in a water heater or tankless water heating system.

FIG. 1 illustrates a preferred system for detecting a leak in a water heater or tankless water heating system.

Flood detection system 100 includes a controller 101, one or more modular sensors 102*a*, 102*b*, . . . 102*n*, and one or more automatic valves 103*a*, 103*b*, . . . 103*n*. Controller 101 is typically affixed to a water heating system 104, which may be a tankless water heating system or hot water tank. The automatic valve or valves 103 are placed preferably upstream (e.g., valve 103*a*) and optionally downstream (e.g., valve 103*b*) of the water heating system 104. Controller 101 will, in some embodiments, directly plug into an alternating current (AC) power source, and in other embodiments, connect to a power source via a direct current (DC) wall power adapter 105 that converts high voltage (115 V-120 V) AC to a suitable low voltage DC. Alternatively, power may be supplied to the controller 101 via one or more batteries. Features of these components are described below in FIGS. 3-7.

Figure 2:
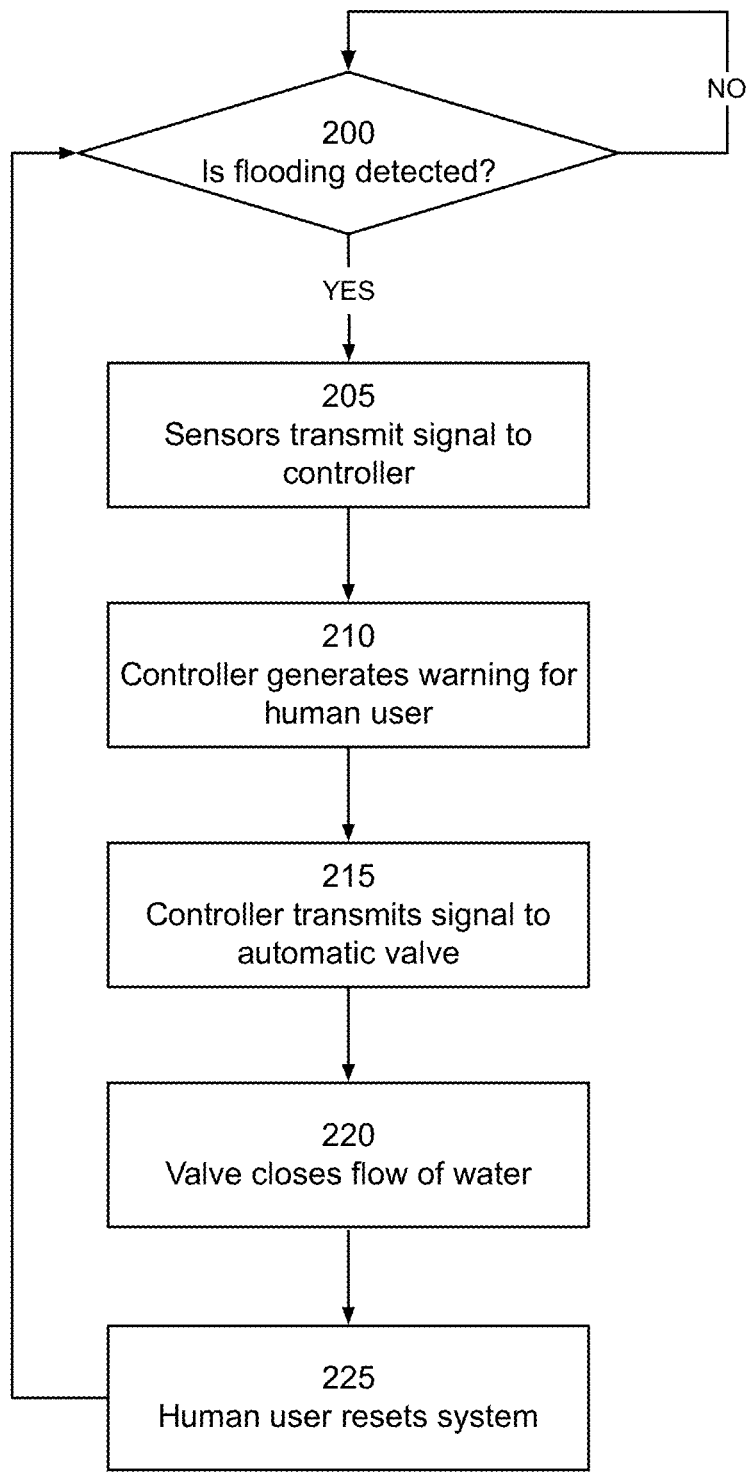
FIG. 2 illustrates, in simplified form, an example method for detecting and responding to flood damage.

FIG. 2 illustrates, in simplified form, an example method of detecting and responding to a flooding event.

When active, the flood sensor(s) 102 continually check for the presence of flooding (Step 200). If flooding is not detected, the system continues to standby and wait for a change in state or circumstances. If flooding is detected by one or more of the flood sensors 102, the system proceeds to the next step (Step 205).

Each of the flooding sensors 102*a*, 102*b*, . . . 102*n* preferably incorporates a communications module coupled to a socket or receiver of the controller 101 via either a wired or wireless connection. Upon detecting flooding, this connection is used to transmit a signal from the flood sensor 102 to the controller 101 indicating that water has been detected (Step 205).

Upon receiving the signal, the controller 101 generates a warning for a human user (Step 210). The warning is configured to be received by the human user even if the user has limited or diminished sensory capacity, including, by way of non-limiting example, complete or partial deafness or hearing difficulty within a specific frequency range, complete or partial blindness, colorblindness, other visual impairment, or limited hearing and/or sight due to advanced age. As a result, the warning may include both a visual component and an auditory component, so that any user unable to sense one component of the warning will more likely be able to sense the other component.

The visual component preferably includes a color of light generated by light-emitting diodes (LEDs) in the flood sensor 102 and/or the controller 101. For example, one or more LEDs on the controller 101 may emit a continuous first color (e.g., green) when the controller is in operation and all systems are normal, and switch to a second color (e.g., red, to indicate danger, or blue, to indicate water) upon receiving a signal indicating the presence of water from the flood sensor(s) 102. In an alternative embodiment, pulses or flashes of a single color of light may be used instead of a change in color of light. In another embodiment, colors of light may begin to alternate between two or more different colors. In yet another embodiment, flashes of light may follow a predefined pattern to draw more attention to the light than a simple blinking light would receive. In yet another alternative, the colors of the LEDs may be selected so that they will be distinguishable even if the human user has a particular form of color-blindness or other visual defect, such as (but not limited to) utilizing yellow and blue as signal colors instead of red and green. In some embodiments, a layer of acrylic plastic over the surface of the LEDs may be used to diffuse the light over a greater surface area of the controller 101 and increase visibility of the light.

The auditory component preferably includes a recorded audio message that is played by a speaker incorporated into or otherwise operably connected to the controller 101. The message may be a pre-recorded spoken message containing a number of alerts or instructions, including, for example, "Warning! Flooding has been detected! Call your plumber. Hot water system has been deactivated," or other similar pre-recorded messages stored in a memory of the controller 101. The message preferably repeats until the system is deactivated by a human user after beginning to fix the leak or notifying a plumber or other person with the ability to fix it. The auditory component may also include a siren or klaxon-like noise, a beep or pattern of beeps at high volume and a particular frequency, or beeps at varying frequencies, in case the human user has diminished hearing within a particular frequency range. The auditory component may include customization, such as multiple voice options to pick from based on a human user's tastes or ability to hear, or changes to volume or frequency of the played voice, siren, and/or beeping.

In alternative embodiments, warning may have additional communicative components, including, for example, vibration of the controller 101 itself to generate not only an auditory but also a tactile component. If the controller 101 has a wireless communications component, a message may be sent over a wireless network to a centralized server, personal computer, or mobile computing device, for delivery to the human user.

In conjunction with generating the warning for the human user, after receiving the signal from the flood sensor 102, the controller 101 transmits a signal (Step 215) to an automatic valve 103 instructing the valve to shut itself to prevent further flooding. Further discussion of this automatic valve 103 is provided below with respect to FIG. 7.

In response to receiving that instruction, the automatic valve 103 will automatically close and shut off the flow of water into or out of the heater 104 (Step 220), thereby preventing any further flooding that may be occurring due to a leak in the heater 104 or downstream from the heater.

The automatic valve 103 may preferably be reopened manually and the system 100 reset (Step 225) by the human user or a plumber after the leak is repaired and flooding is contained, after which the system will resume attempting to detect flooding (Step 200).

Figure 3:
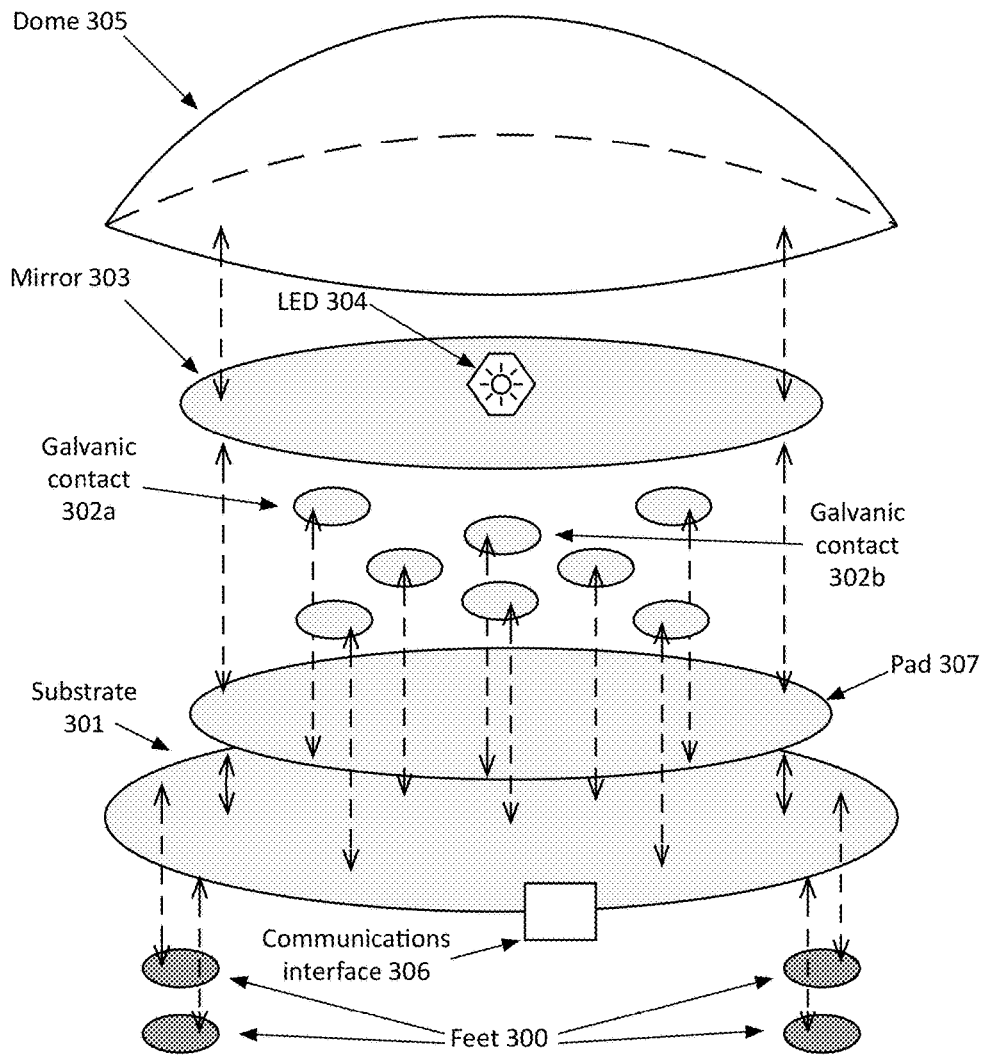
FIG. 3 illustrates, in simplified form, an example exploded view of a modular flood sensor to be used in the system of FIG. 1.

FIG. 3 illustrates an exploded view of a preferred modular flood sensor 102 for use in in the flood detection system of FIG. 1.

Sensor 102 preferably has a generally cylindrical or hemispherical shape, and includes a substrate surface 301, one or more galvanic contacts 302a, 302b, . . . 302n, one or more feet 300, a mirrored surface 303, one or more light emitting diodes (LEDs) 304, a translucent dome or cover 305, a communications interface 306, and a wicking pad 307.

Substrate 301 is, in one embodiment, a circuit board onto which circuitry is affixed for evaluating electrical signals from/voltage differences between the galvanic contacts 302a, 302b, . . . 302n. In alternate embodiments, substrate 301 may be a plain plastic, metallic, or other rigid surface to which one or more microchips, integrated circuits, or other sensor components may be affixed.

Wicking pad 307 is preferably a circular or other shaped element made of a spongy, fabric-like, perforated, or other material that is permeable or semi-permeable with respect to water, and is affixed above or below the one or more galvanic contacts 302a, 302b, . . . 302n. Moisture that comes into contact with the wicking pad 307 spreads via capillary action to two or more of the galvanic contacts 302a, 302b, . . . 302n, decreasing the electric potential between those contacts and thereby allowing detection of the moisture. The wicking pad 307 may be affixed above or below the galvanic contacts 302a, 302b, . . . 302n, and may be separated into multiple pads.

The galvanic contacts 302a, 302b, . . . 302n are conductive elements, preferably made of SAE (Society of Automotive Engineers) 304-rated stainless steel, in order to minimize corrosion over time and ensure that proper galvanic readings can be taken by the sensor 102. The contacts 302a, 302b, . . . 302n may be affixed to the upper surface of substrate 301, affixed to the lower surface of substrate 301, or may be screwed through or otherwise affixed to substrate 301 so that they are able to sense moisture both above and below substrate 301.

Feet 300 may be affixed to the bottom of substrate 301, in order to elevate the sensor 102 above the ground or floor (e.g., approximately 1 millimeter or more) and avoid false positive results from a small amount of localized spilled water or dripped condensation that does not reflect an actual flooding situation. Feet 300 may be, in some embodiments, magnetic or adhesive to fix the sensor 102 in a chosen location, or may be made of insulating rubber to electrically isolate the sensor 102.

Communications interface 306 may be used to transmit signals to the controller 101 when flooding is detected by the sensor 102. Communications interface 306 may include, for example, a socket into which a data bus, universal serial bus (USB), or other wired connection may be inserted. In an alternative embodiment, the connection may be a wireless connection interface, such as (but not limited to) a connector enabling Bluetooth, wireless Internet, or another wireless protocol. Communications interface 306 is preferably controlled by a computing device attached to or built into substrate 301, which may be, for example, an integrated circuit, stand-alone processor, motherboard/breadboard assembly, or other computing system as may be described below with respect to FIG. 8. The computing device may also be used to evaluate the results of the galvanic contacts 302 and determine whether flooding has occurred. Communications interface 306 may also be used in some embodiments to deliver power from the controller 101 to the sensor 102; in other embodiments, the sensor may have a separate external power source or internal battery(ies).

Sensor 102 also includes, in a preferred embodiment, one or more LEDs 304, a mirrored surface 303, and a translucent plastic dome or cover 305. LED 304 may be a single-color or multiple-color LED. When sensor 102 is active but has not detected flooding, LED 304 preferably emits a constant color (e.g., green) light, which reflects off of mirrored surface 303 to illuminate a portion of or the entire translucent dome 305, thereby allowing a human user to see that the flood detection system 100 is operating and has not detected flooding. When flooding is detected by sensor 102, the light from LED 304 may change (or another colored LED may be illuminated) to indicate the flooding, such as (but not limited to) changing to a blue color to indicate the presence of water, or to red or another color to indicate attention is required. Like the visual signal described above, flashing, patterns, or different color schemes may be used to draw attention to the sensor 102 and indicate that flooding is happening and must be dealt with promptly.

In an alternative embodiment, the feet 300 of sensor 102 may be translucent and include one or more single or multiple-color LEDs to provide a visual indication of the state of the sensor and flood detection system 100. This may be in lieu of or in addition to the one or more LEDs 304 discussed in the preceding paragraph.

In another alternative embodiment, a method different from galvanic response may be used to determine the presence of water at the sensor 102. In this alternative embodiment, one or more sensors using such a different method may replace the galvanic contacts 302a, 302b, ... 302n and wicking pad 307 of sensor 102.

Figure 4:
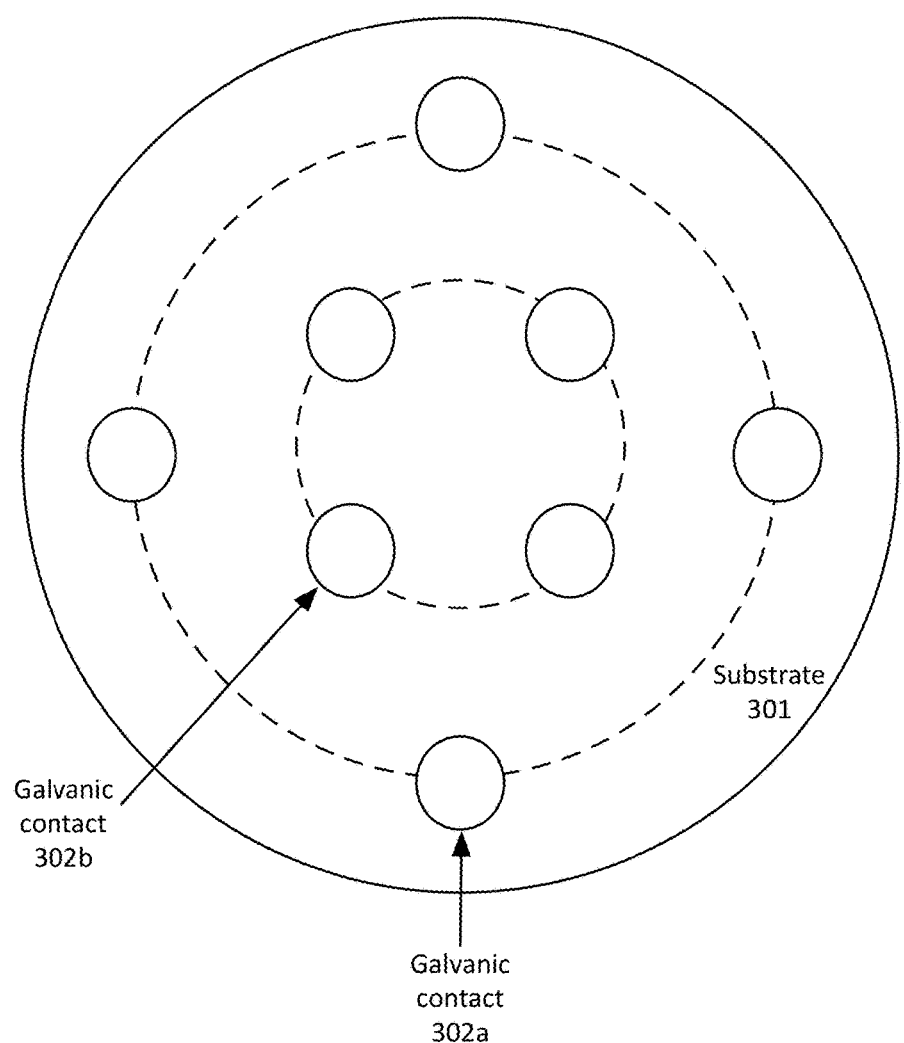
FIG. 4 illustrates, in simplified form, an example a top-down view of the galvanic contacts and substrate of a flood sensor of FIG. 1.

FIG. 4 illustrates a top-down view of the galvanic contacts 302a, 302b, ... 302n and substrate 301 of a preferred flood sensor 102 for use in the flood detection system 100 of FIG. 1.

In one preferred embodiment, the sensor 102 includes eight galvanic contacts 302a, 302b, ... 302n arranged in two concentric circles having four galvanic contacts each. The outer circle of contacts 302, including for example galvanic contact 302a, may be positioned at equally spaced points along the outer circle. The outer circle may, for example, have a radius of 11.8 mm from the center, or 6.35 mm from the outer edge of the substrate 201. The inner circle of contacts 302, including for example galvanic contact 302b, is set at equally spaced points along the inner circle, which may, for example, have a radius or 6.37 mm from the center, or 11.78 mm from the outer edge of substrate 201. Preferably, the contacts 302 on the inner circle are positioned at angles equally spaced between those of the outer circle (e.g., the outer circle contacts are positioned at 0, 90, 180, and 270 degrees around the outer circle; the inner circle's contacts are positioned at 45, 135, 225, and 315 degrees around the inner circle). The resulting shape is a star-like, asteroid, or tetracuspid formation of contacts.

In alternative embodiments, a different number of contacts 302 may be used (so long as at least two such contacts are used, to enable determination of a voltage differential between the contacts). The contacts 302 may be arranged in any formation, including using more or fewer circles of contacts, more or fewer contacts per circle, or arranging the contacts in a non-circular or irregular pattern throughout the sensor 102. The sensor 102 itself may be constructed with a different cross-section from a circle, including a polygonal or elliptical shape, and the contacts 302 may be differently arranged to accommodate a different cross-sectional shape.

Figure 5:
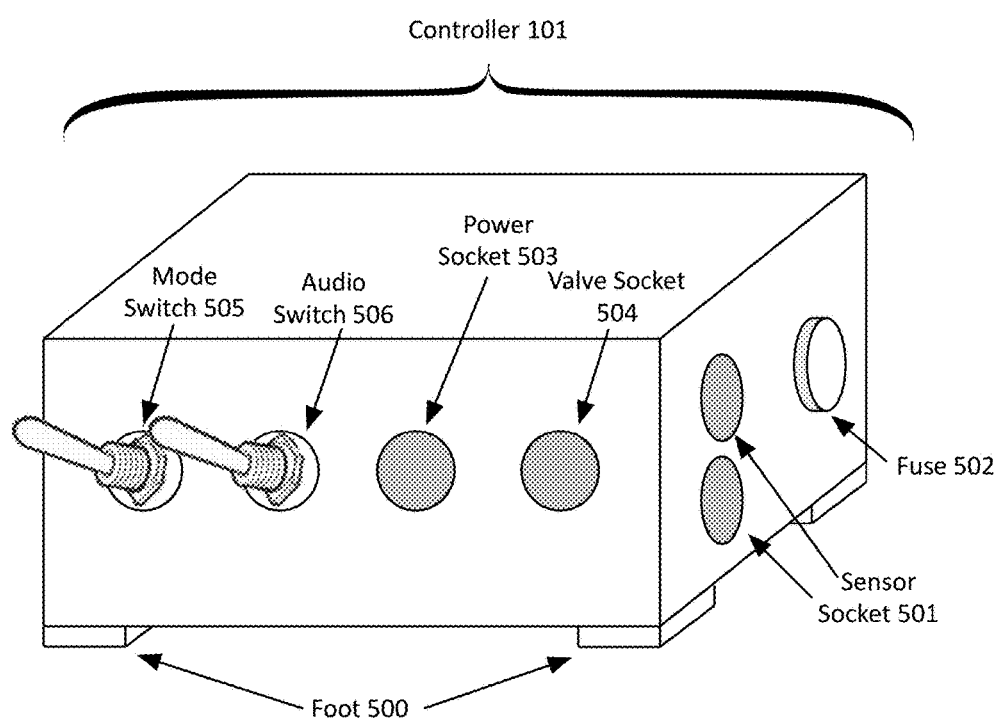
FIG. 5 illustrates, in simplified form, an example a front isometric view of a controller to be used in the flood detection system of FIG. 1.

FIG. 5 illustrates, in simplified form, an example front isometric view of a controller 101 to be used in the flood detection system of FIG. 1.

Controller 101 may incorporate one or more magnetic feet 500 for affixing the controller to the surface of a tankless water heating system, hot water tank, other water storage system, or another wall or available surface. The magnetic feet 500 may be made from (but are not limited to) neodymium, another magnetic rare earth composition such as samarium-cobalt, ordinary ferromagnets such as magnetized iron or nickel, or electromagnets powered by the controller 101 itself. The magnets should be strong enough to affix the controller 101 to a metallic surface that is perpendicular to the ground, suspending the controller at a height suitable for human interaction and visibility. If an intended human user can stand and walk freely, the controller 101 may be affixed at a height higher than if an intended user is wheelchair-bound or otherwise differently-abled, and the height may be customized to a particular user's eye level or hand level. The magnetic feet 500 may, for example, have a height of about one eighth inch (0.3 cm) and a width of about one half inch (1.25 cm), or may be differently sized or shaped so long as they produce sufficient magnetic attraction between the affixed face of the controller 101 and the affixing metallic surface. The magnetic feet 500 may incorporate a friction-padded surface so that sliding or other movement along the metal surface is resisted.

In alternative embodiments, the magnets may be placed inside the controller rather than as external feet 500. The magnets may also differ in number or position. For example, rather than four magnets at corners, the magnets may be placed along the edges, in a central location, or at multiple locations along the affixed surface of the controller 101.

In other alternative embodiments, a different method may be used to affix the controller 100 to a surface, including, but not limited to, patches of Velcro, adhesive patches, suction cups, clamps, screws, nuts and bolts, etc. Further, while suspension of the controller 101 is preferred from a usability perspective, placement of the controller on the ground, a shelf, or another location is envisioned and will not impede its functionality.

The controller 101 preferably includes a waterproof housing having a number of input and output interfaces, including at least one sensor socket 501 for operatively connecting the controller 101 to the one or more flood sensors 102, and at least one valve socket 504 for operatively connection the controller 101 to one or more automatic valves 103. In alternative embodiments, wired connections between the flood sensor(s) 102 and controller 101, or between controller 101 and automatic valve(s) 103, may be replaced by a wireless communication method, including (but not limited to) Bluetooth or wireless Internet, that does not necessitate a physical socket in the housing.

Power socket 503 receives a power cord from DC adapter 105, preferably with an input voltage of 5V. In alternative embodiments, controller 101 may incorporate an AC/DC converter and be able to plug directly into a wall power source without need of a DC adapter. In other embodiments, the controller 101 may instead have a slot for inserting a battery or use another power source entirely different from residential AC power.

Controller 101 may incorporate a fuse 502, for example, a ¾ ampere (750 mA) glass fuse, to protect the circuitry of controller 101 in the event of a short circuit, power surge, malfunction of DC adapter 105, or other electrical issue. The fuse 502 can be readily replaced in the event that the fuse is blown, avoiding the necessity of replacing the entire controller 101.

Controller 101 preferably incorporates a mode switch 505 that allows the human user, a plumber, or another person to toggle the flood detection system 100 between a service mode and an active mode. During the service mode, the system 100 will not alert, and plumbing work can be done or the system disassembled and reassembled. During the active mode, the flood detection system 100 will alarm and close valve(s) 103 in response to the sensor(s) 102 detecting moisture or flooding.

Controller 101 preferably incorporates an audio switch 506 that allows the human user or another person to toggle the controller's playing of audio between two or more different modes. In a preferred embodiment, the two modes include a "Talk Alarm" mode and a "Beep Alarm" mode, such that the former mode will cause the audio component of the warning to be a prerecorded voice only, and the latter mode will cause the audio component of the warning to be a beep only. In an alternative embodiment, the modes may include one or both of the "Talk Alarm" mode and the "Beep Alarm" mode, in addition to a "Volume Off" mode. When the audio switch is not in the "Volume Off" position, the default alarm of sirens and/or vocal warnings will repeatedly play until the system 100 is placed in service mode or the volume switch is changed to the "Volume Off" position. A human user who wishes to only be notified via visual signals may choose to pre-emptively set the controller 101 to the "Volume Off" mode via the audio switch 506 when the system 100 is first activated, rather than wait until it is already generating audio prompts.

Figure 6:
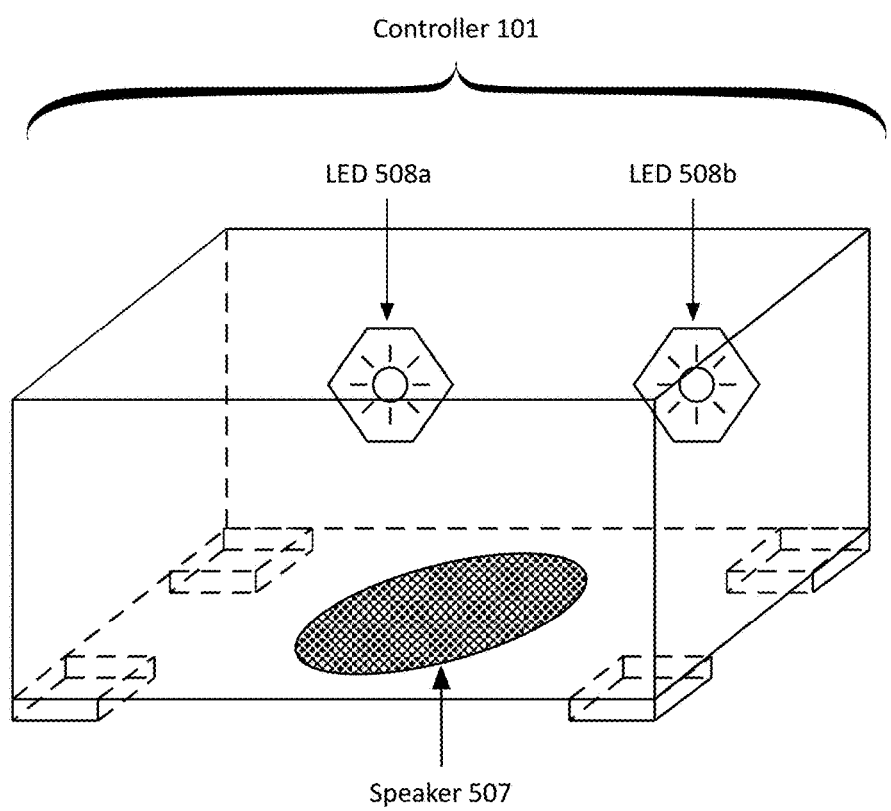
FIG. 6 illustrates, in simplified form, an example front isometric view of the controller of FIG. 5, utilizing transparency to show additional components.

FIG. 6 illustrates, in simplified form, an example front isometric view of a controller 101 to be used in the flood detection system of FIG. 1, utilizing transparency to show additional components.

Speaker 507 may be used to output or play the recorded auditory message when flooding is sensed (described above as Step 210), assuming that audio switch 506 has not been set in the "Beep Alarm" position or used to turn off audio entirely. Speaker 507 may also be used to output or otherwise communicate other messages to the human user, such as (but not limited to) a message that the flood detection system 100 has become active, in response to the controller 101 determining that it is powered, coupled to at least one flood sensor 102, and coupled to at least one automatic valve 103. Other messages may indicate that the controller 101 itself requires servicing, that power to controller 101 has been lost, that a sensor 102 or valve 103 has become disconnected or is inactive, or any other pertinent information about the functioning of the system 100 or any of its components.

The controller 101 may also include colored LEDs 508a and 508b to communicate the visual message or alert to the human user. In a preferred embodiment, LED 508a is, for example, a green LED that remains lit when the system 100 is active and does not sense flooding, and turns off when flooding is detected by sensor(s) 102. LED 508b may be, for example, a red LED that begins to flash when flooding is detected by sensor(s) 102. LED 508b may also emit a constant colored light (e.g., red) to indicate that the service mode has been activated by switch 505, and continue the constant colored light until the service mode is deactivated. At least one surface of the housing of controller 101 may be formed from an acrylic material (not shown) to diffuse the light from the LEDs 508a and 508b, and make the light more visible to a human user.

Figure 7:
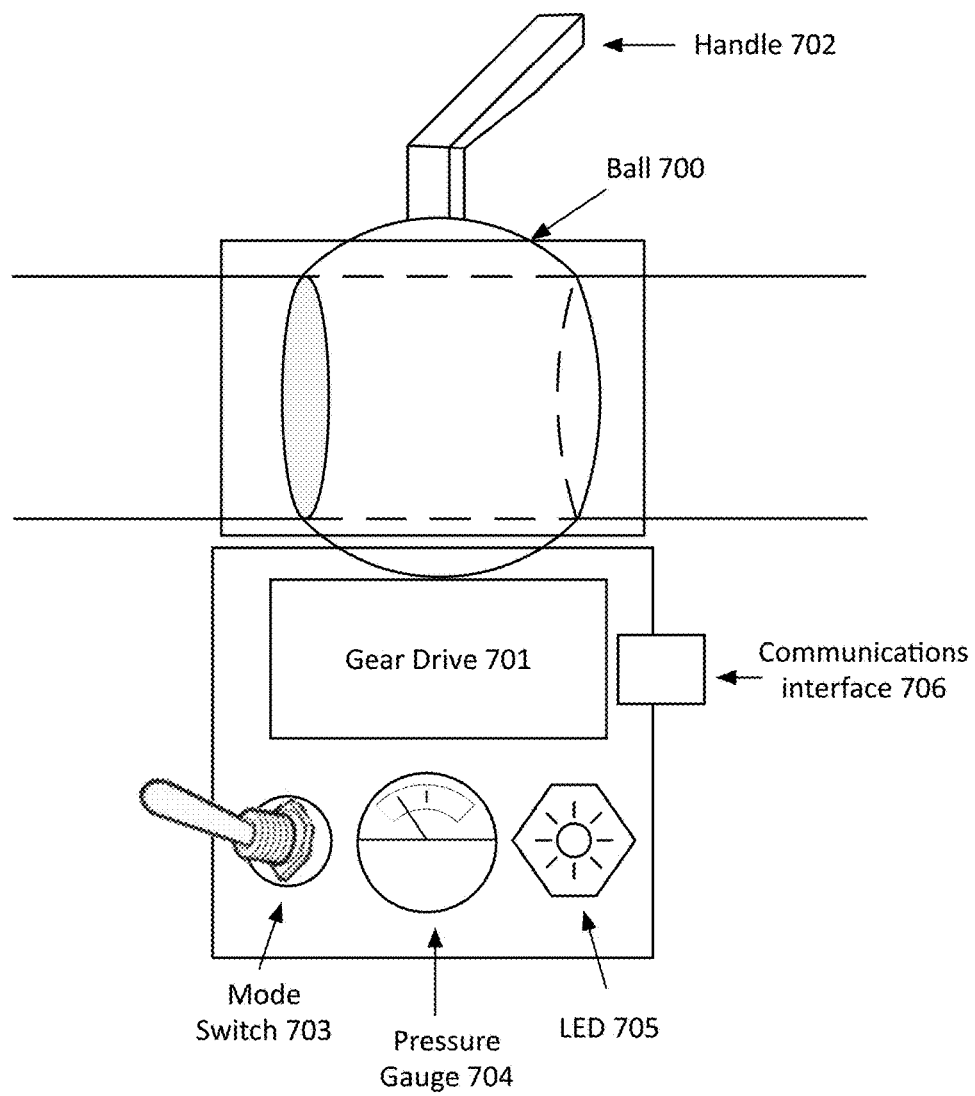
FIG. 7 illustrates, in simplified form, an example automatic valve to be used in the flood detection system of FIG. 1.

FIG. 7 illustrates, in simplified form, an example automatic valve 103 that may be used with the flood detection system of FIG. 1.

The automatic valve 103 may be, for example, a ball valve comprising a brass gear drive system 701 and an optional handle 702, either of which can rotate an SAE 304-rated stainless steel ball 700 so that a flow of water that previously flowed through a cylindrical aperture in the ball 700 is instead blocked by the walls of the ball. Ball 700 may, for example, have a diameter of between one half inch (1.25 cm) and two inches (5 cm). The drive system 701 preferably generates about 2 newton meters of torque with only about 5 volts power input, rotating the ball 700 to close the valve even with a water flow at 1 megapascal (145 P.S.I.) in less than five seconds. If a two-inch diameter ball is used, a water flow of 1.6 megapascals (232 P.S.I.) can be halted.

Valve 103 may optionally incorporate a pressure gauge 704 to indicate the current water pressure and give a human user advance warning that overpressure is occurring and may cause leaks or equipment damage.

Valve 103 may incorporate an LED 705, similar to the LEDs of the controller 101 and sensor(s) 102, which can be used to indicate that the valve 103 is open and ready to receive a close instruction (in one embodiment, shown by a continuous green light), has closed in response to an instruction from the controller 101 (in one embodiment, shown by a flashing red light), or is in a service mode (in one embodiment, shown by a continuous red light). Different color schemes or flash patterns may be used as necessary to account for diminished vision of the human user or the human user's colorblindness.

Mode switch 703 may be used by a human user to place the valve 103 in a service mode for installation, removal, maintenance, etc., during which it will not automatically close.

Valve 103 also incorporates a communications interface 706 to receive and evaluate signals from controller 101 and determine that the valve must close in response to flood detection. Like the connection between controller 101 and sensor(s) 102, the connection between valve 103 and controller 101 may be wired or wireless, and may use any wired or wireless communications protocol or standard, including, for example only, USB, other data bus, Bluetooth, or wireless Internet.

In alternative embodiments, other forms of automatic valve may be used for valve 103 instead of a ball valve, including, by way of example only, solenoid valves, globe valves, or diaphragm valves.

Figure 8:
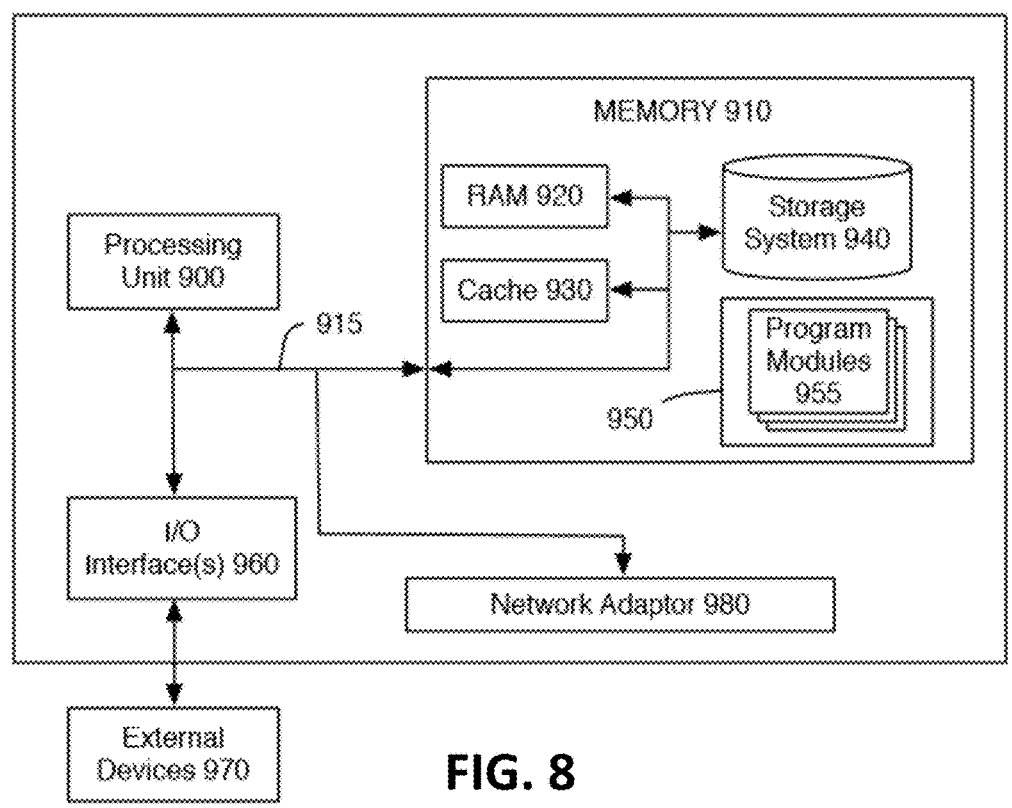
FIG. 8 is a block diagram of a computing device that may be utilized to implement various features and processes described herein.

FIG. 8 is a high level block diagram of a representative computing device that may be utilized to implement various features and processes described herein, for example, the automated functionality of controller 101, flood sensor(s) 102, automatic valve(s) 103, or any other components of flood detection system 100. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 8, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single [system server; computing device; computer system] or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for alerting a user with diminished sensory capacity that a leak has been detected in a water heating system, comprising:
    at least one sensor for detecting presence of water, comprising two or more galvanic contacts, the at least one sensor being configured to:
        in response to detecting moisture via the two or more galvanic contacts, transmit a leak detection signal, and
        display an alert that the leak has been detected;
    at least one automatic shut-off valve for controlling flow of water to or from a tankless water heating system or hot water tank; and
    a controller, magnetically affixed to an exterior surface of the tankless water heating system or hot water tank, and communicatively coupled to the at least one sensor and at least one automatic shut-off valve, wherein the controller is configured to:
        store instructions for displaying a set of messages comprising a plurality of pre-recorded audio messages and at least one visual message,
        receive the leak detection signal from the at least one sensor,
        automatically transmit, in response to the received leak detection signal, a shut-off signal to the at least one automatic shut-off valve instructing the at least one automatic shut-off valve to close and prevent flow of water, and
        in response to the received leak detection signal, select and display, to the user with diminished sensory capacity, at least one message of the set of messages, via a sensory medium different from a sense in which the user has diminished sensory capacity.

2. The system of claim 1, wherein at least one of the plurality of pre-recorded audio messages comprises a spoken identification of the system and one or more verbal instructions to the user with diminished sensory capacity.

3. The system of claim 1, wherein at least one of the plurality of pre-recorded audio messages comprises a beep having a predetermined frequency.

4. The system of claim 1, wherein the at least one visual message comprises a change in a color of displayed light indicating that the leak has occurred.

5. The system of claim 1, wherein the at least one visual message comprises a change in a timing pattern of displayed light indicating that the leak has occurred.

6. The system of claim 1, wherein each of the one or more sensors comprises two or more galvanic contacts and determines the presence of moisture via a difference of voltage between two of the two or more galvanic contacts.

7. The system of claim 6, wherein at least one of the one or more sensors comprises six or more galvanic contacts arranged in two or more concentric circular arrangements.

8. The system of claim 6, wherein each of the one or more sensors comprises a wicking pad capable of passing water to the two or more galvanic contacts.

9. The system of claim 1, wherein the one or more automatic shut-off valves is placed upstream from the tankless water heating system or hot water tank.

10. The system of claim 1, wherein the controller is suspended from the tankless water heating system or hot water tank at an eye level or hand level of the user.

11. The system of claim 1, wherein the automatic shut-off valve is configured to completely shut off a flow of water at a pressure of between about one megapascal and 1.6 megapascals within five seconds of receiving the signal instructing the automatic shut-off valve while utilizing a voltage of less than five volts.

12. The system of claim 1, wherein the storing instructions for displaying at least one pre-recorded audio message comprises storing a plurality of pre-recorded audio messages, and wherein the controller is further configured to:
receive a user selection of one pre-recorded audio message of the plurality of pre-recorded audio messages to play in response to receiving the leak detection signal.

13. The system of claim 1, wherein the controller is magnetically affixed to the tankless water heating system or hot water tank via one or more feet comprising rare earth magnets.

14. The system of claim 1, wherein the controller or at least one of the at least one sensors comprises at least one light emitting diode and a translucent outer surface diffusing light from the at least one light emitting diode over the translucent outer surface.

15. A computing device for flood mitigation, comprising:
a speaker;
one or more light emitting diodes;
a processor; and
non-transitory memory storing instructions that, when executed by the processor, cause the computing device to:
receive a flood detection signal indicating presence of moisture at one or more flood sensors,
transmit, in response to the received flood detection signal, a shut-off signal to an automatic shut-off valve instructing the automatic shut-off valve to close the valve and prevent flow of water, and
display, via the speaker and via the one or more light emitting diodes, messages configured to inform a human bystander with either diminished vision or diminished hearing capacity that a leak has occurred.

16. The computing device of claim 15, wherein the message comprises a recorded spoken identification of the system and comprises one or more verbal instructions to the human bystander.

17. The computing device of claim 15, wherein the message comprises a color-coded light message indicating that the leak has occurred.

18. A computing device for sensing flooding, comprising at least two galvanic contacts and a light emitting diode, and wherein the device is configured to:
display, via the light emitting diode and while no flooding is detected by the computing device, a color-coded visual cue to a human user with diminished hearing capacity, indicating that no flooding is detected;
display, via the light emitting diode and responsive to detecting flooding via a difference in voltage between the galvanic contacts, a different color-coded visual cue to the human user, indicating that flooding is detected; and
transmit, to an automatic shut-off valve, an instruction to close and prevent a flow of water through the valve.

19. The computing device of claim 18, wherein the galvanic contacts comprise at least two concentric circular arrangements of at least four galvanic contacts each, and in which a first circular arrangement is rotated with respect to a second circular arrangement.

* * * * *